United States Patent

Perry

[15] 3,688,287

[45] Aug. 29, 1972

[54] COMPUTER MEMORY SYSTEM

[72] Inventor: Ralph S. Perry, Richardson, Tex.

[73] Assignee: Texas Instruments Incorporated, Dallas, Tex.

[22] Filed: Aug. 24, 1970

[21] Appl. No.: 66,298

[52] U.S. Cl.....................340/174.1 E, 179/100.2 B, 179/100.2 P, 179/100.2 CA, 340/174.1 F, 340/261, 340/267 R, 340/269

[51] Int. Cl.......G08b 21/00, G11b 5/60, G11b 19/08

[58] Field of Search.........340/174.1 E, 174.1 F, 261, 340/269, 267 R; 179/100.2 B, 100.2 P, 100.2 CA

[56] References Cited

UNITED STATES PATENTS

| | | | |
|---|---|---|---|
| 3,401,383 | 9/1968 | Ault | 340/174.1 E |
| 3,550,107 | 12/1970 | Thompson | 340/267 R |
| 3,579,220 | 5/1971 | Stevenson | 340/261 |
| 3,394,581 | 7/1968 | Johnson | 340/261 |
| 3,201,776 | 8/1965 | Morrow | 340/267 R |

*Primary Examiner*—Howard W. Britton

*Attorney*—Samuel M. Mims, Jr., James O. Dixon, Andrew M. Hassell, John G. Graham, Harold Levine, Alva H. Bandy, René E. Grossman and James T. Comfort

[57] ABSTRACT

In a computer a memory system is provided which comprises a plurality of rotating disc type magnetic memory elements mounted upon a motor driven shaft. The magnetic discs are designed to store information in the form of magnetic bits on two sides. Faulty areas are located on the discs and bypassed by switching to another disc on a sector basis to ensure computer reliability. The disc memory elements receive information from a plurality of read-write heads which during normal operation are in flying association with the discs. For each memory disc, there is a yoke assembly which includes a plurality of read-write heads spring connected to a yoke which is supported over each magnetic memory disc. The computer memory system includes an ultrasonic collision detector to detect during operation damaging hits or collisions between a memory disc and an aerodynamically unstable head. For disc-head collision detection, a piezoelectric ceramic element is attached to each disc yoke to detect vibrations and, in particular, those occurring when any element of a head comes in contact with a memory disc. The vibrating frequencies of the piezoelectric ceramics are converted to electrical signals, amplified and passed through Tschebyscheff filters to eliminate normal operating frequencies detected by the ceramics and to pass memory element damaging frequencies to a second amplifier. The second amplifier has two outputs — one output to an analog multiplexer to provide on an oscilloscope a look at each memory disc operating to determine the nature of the collision, and a second output to a detector where the signal inputs are compared and an indicator lamp actuated to indicate which memory element is in contact with the head and to actuate a relay to open a master switch to shut down the computer memory system.

16 Claims, 3 Drawing Figures

COMPUTER MEMORY SYSTEM

Figures 1, 2A:
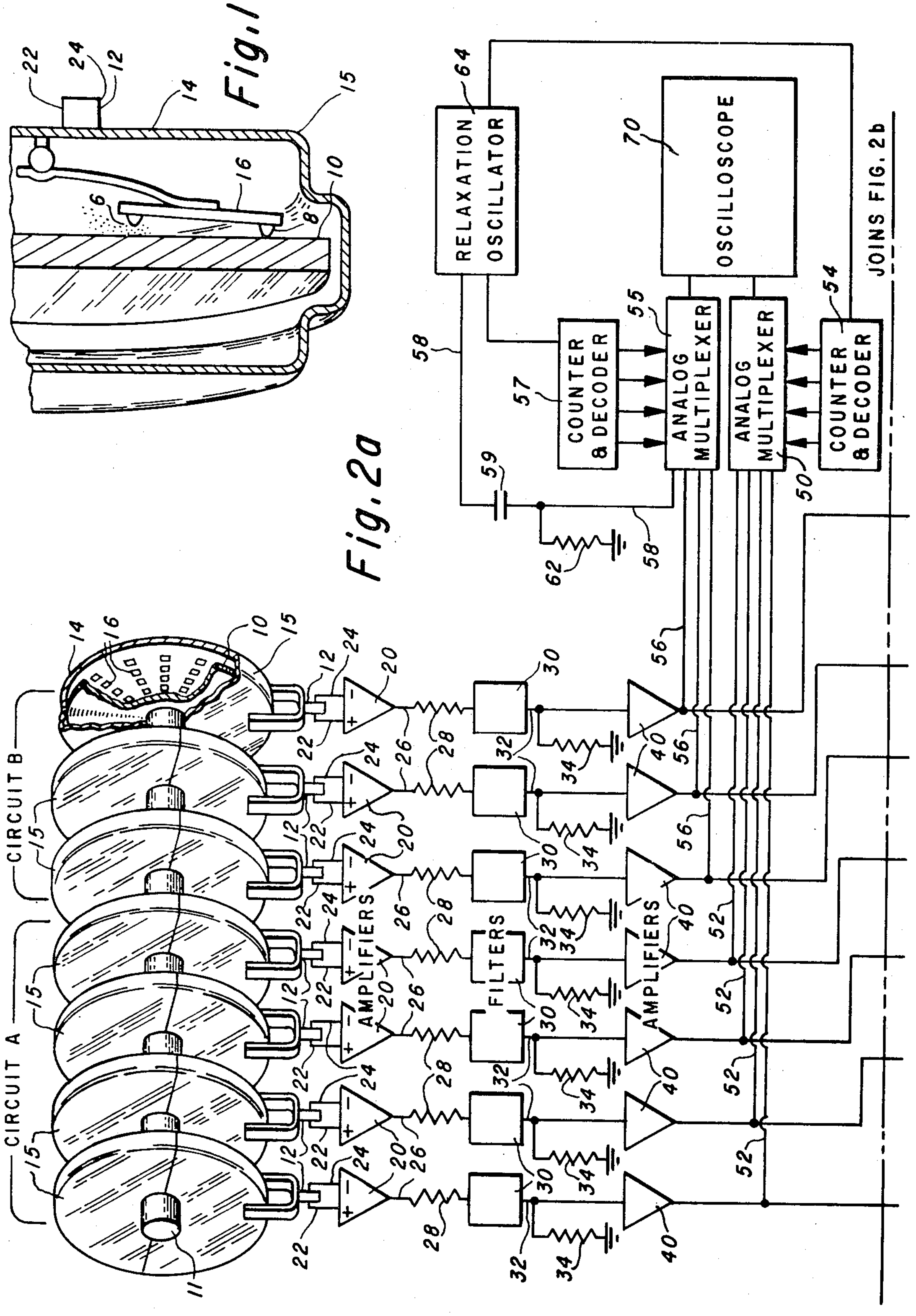

This invention relates to computers, and in particular to a computer memory system having a read-write head disc collision detector for monitoring aerodynamic stability of the read-write heads in operative association with the magnetic memory disc elements.

In the past, various read-write head arrangements have been devised for storing data on magnetic memory elements having defects in their recording surfaces. One arrangement was to record the information on two different memory elements. Another arrangement was to monitor each block of the memory element electrically and skip the faulty areas; any information originally planned for that block which was left over was recorded in another area. Further in the past, various arrangements were devised for detecting the aerodynamic instability of a read-write computer head flying over a memory drum. These arrangements in general utilized variations in capacitance attending changes in the space between the head and recording surface when they were treated as opposite plates of a capacitor separated by an air dielectric. In this capacitor type arrangement, a hit was detected by the capacitor being shorted out by contact with the recording surface. Another arrangement for a hit detector included a voltage source applied to a high resistant lead that was attached to the head. The output of the lead from the magnetic head normally remained at a fixed potential level; however, when the head collided with the magnetic recording surface, such as a drum, the lead was grounded, thereby providing no output voltage on the lead.

The problem with the prior art is that it does not contemplate a large memory system capable of receiving information on line where time of recording and accuracy or completeness of the recorded information is of the essence. For instance, the prior art collision detection systems which are operable responsive to voltage drops detected when a head comes in contact with a memory element are not adaptable to computers using a large number (64) of heads with each disc; the space required to house the circuitry precludes use of the prior art system. In addition, the prior art provides only a low order of hit detection for large computers, in that it does not provide means for observing the performance of the memory elements and their heads and for identifying the memory elements having an aerodynamically unstable head.

Computers must store large quantities of information on magnetic discs in order to handle the flow of data necessary for scientific applications. The magnetic discs store the data in the usual fashion with the use of a plurality of track data surfaces. Each circular track of the disc contains binary coded information in that an element of the track can be magnetized in either one of two directions. Information is written on the magnetic disc or read from the disc by heads flying at high speeds. The flying heads normally do not come into contact with the magnetic disc but are floated above the disc by a thin film of air. Slight irregularities of the surface of the disc are compensated for by the thin film of air which keeps the head away from the disc at a reasonable constant distance. Various factors such as dust, dirt, and other impurities between the surface of the disc and a head, excessive vibration of the computer, failure of the head to fly, to name only a few, may cause the head to remain in contact with the disc to tend to damage either the information stored in the element of the disc or the disc itself. A collision between the head and disc might also damage the head. Either a damaged disc or head is undesirable.

It is the object of this invention to provide a novel computer memory system.

It is another object of this invention to provide a computer memory system which includes a novel magnetic disc memory subsystem.

It is still another object of this invention to provide a novel computer memory which includes a novel detection system.

Still another object of this invention is to provide a novel system for monitoring the performance of magnetic memory elements and their associated flying heads.

Another object of this invention is to provide a novel system for detecting collisions between the disc and the flying head.

Yet another object is to provide means for shutting down the computer to prevent damaging the disc.

Briefly stated, the invention includes a computer memory system having a plurality of magnetic disc memory elements and as an integral part thereof, an ultrasonic collision detector. The plurality of magnetic discs includes a reserve disc for receiving information which would have been received by another disc but for a surface defect. Each of the remaining magnetic discs have two memory storing surfaces having 512 tracks on each surface. For each disc surface, there are 32 read-write heads; each head has 16 elements. The yoke assembly is placed over each disc and provides springs for mounting each of the read-write heads adjacent the memory disc surfaces. Each spring is properly tensioned so that air between the magnetic disc surface and the read-write head lifts the head from the magnetic disc during normal operation; that is to say, the heads fly during normal operation. Nevertheless, the heads do not always fly. Thus, the memory system includes the ultrasonic collision detector which includes a piezoelectric ceramic transducer element secured to each yoke assembly. The transducer converts its yoke assembly vibrations to electrical signals which may be amplified and sent to a filter which passes substantially any disc damaging frequencies to another amplifier for further amplification and passage in two directions — one to an input terminal of a multiplexer and the other to a detector. The multiplexer receives signals for each disc and passes the signals in sequence to an oscilloscope which permits the operator or maintenance man to view the performance pattern of each magnetic memory disc in the system. The detector includes a comparator for each of the yoke assemblies, which may be adjusted to detect and latch on to damaging frequencies for its particular yoke assembly and to pass signals to a disc indicating lamp and to a terminal of an "OR" circuit which controls a relay to open a master switch and shut down the computer memory system upon receipt of such a signal for any of the yoke assemblies.

Figure 2B:
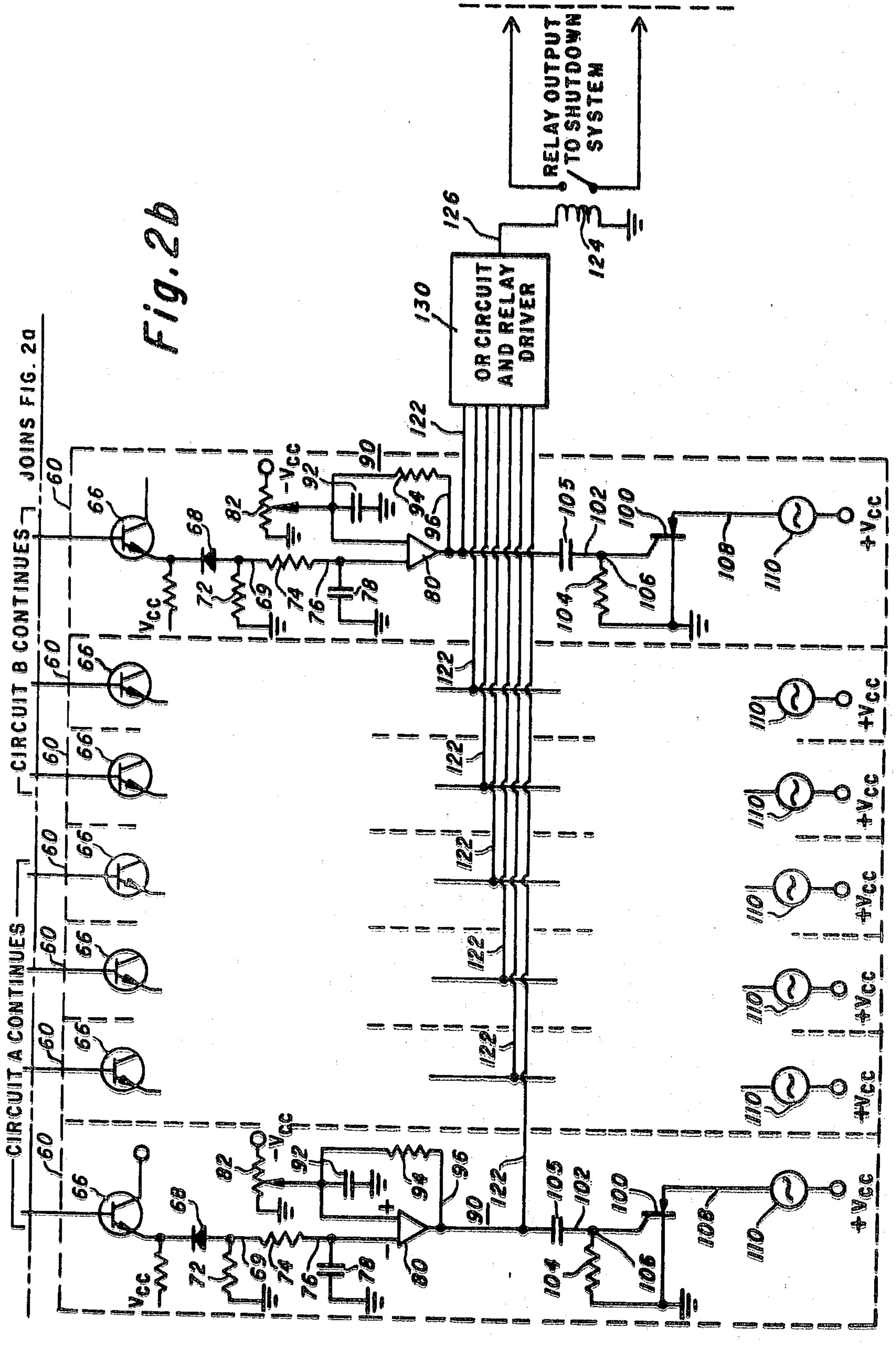

Various features of the invention will become more readily understood from the following detailed description and appended claims when considered in conjunction with the accompanying drawings in which like reference numerals designate like parts throughout the figures thereof, and in which:

FIG. 1 is a fragmentary view of the yoke assembly and memory outlet partly in section and blown up to show the types of damaging hits between elements of a head and a memory disc;

FIG. 2*a* is a diagrammatic view showing an embodiment of the invention;

FIG. 2*b* is a diagrammatic view showing the remainder of the embodiment of the invention shown in part in FIG. 2*a*.

Referring now to the drawings, there is shown in FIG. 2*a* a computer having memory disc 10 mounted for rotation on a single shaft 11. A yoke assembly 14 is provided each memory disc 10. In the yoke assembly 14 a yoke 15 is placed over each disc; each yoke 15 carries 64 (32 on each side) read-write heads 16 adjacent to the faces of the corresponding memory disc 10. In operation, the discs 10 are rotated at about 1,750 rpm; at this speed, the read-write heads 16 normally fly over the discs 10. Nevertheless, the read-write heads do not always fly. Each read-write head 16 has 16 read-write elements; two of the elements 6 and 8 are shown in FIG. 1 to disclose the manner in which the head 16 may cause collision or hit damage. The read-write element 6 has collected lint or dust to the extent that the head 16 has become aerodynamically unstable causing the read-write element 8 to come in damaging contact with the speeding disc. It will be understood, of course, that at speeds of about 1,750 rpm, the disc might be damaged also by the lint collecting under the read-write element 6. Accordingly, a collision detector is provided.

In designing a circuit board for the ultrasonic collision detector, it was found desirable in order to conserve space to divide the system into two circuits, A and B. Thus, the system for detecting hits between the disc 10 and the associated head 16, as shown in the drawings in FIGS. 2*a* and 2*b*, includes two complete circuits; the first circuit, Circuit A having four subcircuits for four of the discs 10 and the second circuit, Circuit B, having three subcircuits for the remaining three discs 10. Each subcircuit has branch circuits hereinafter described. As each of the subcircuits and their branches are identical, only one needs to be described in detail. A transducer 12 preferably of the piezoelectric ceramic type is secured to each assembly 14 preferably to each yoke 15, by a screw or other suitable fastening means. The transducer 12 has a frequency response ranging from the normal vibrations of the yoke 15 which has an upper limit of about 10 kc to a point above the vibrations produced when the flying heads 16 become unstable aerodynamically and strike the surface of the disc 10 which point is at least 45 kc. A differential amplifier 20 having a suitable gain is connected through leads 22 and 24 to the transducer 12 to amplify its vibration frequencies. The amplifier 20 for the system depicted in the drawing has a gain of about 10. The output of the amplifier 20 is connected through lead 26 to a resistor 28, which is to prevent the amplifier 20 from oscillating due to capacitance loading, to a four pole bandpass Tschebyscheff filter 30 having a bandpass between 25–45 kc. A Tschebyscheff filter is preferred because of its sharp rolloff characteristics outside the bandpass. The operation of a Tschebyscheff filter is well known in the art as evidenced by the publication entitled "Synthesis of Passive Network" by Earnest A. Guilleman, third printing April, 1962, John Wiley and Sons Incorporated, pages 588–614. It will of course be understood that the operating frequency of the filter 30 must be that which will block the normal operating frequency of the memory yoke 15 and pass frequencies attending damaging hits between the head 16 and disc 10. The frequency range between 25 and 45 kc has been determined through tests of commercially available magnetic memory discs to be the frequency normally generated by such hits. The output of the filter 30 is connected through lead 32 across an impedance characteristic matching resistor 34 coupled to ground to a single ended input amplifier 40 having a gain of about 10. At this point in the subcircuit, which continues to a detector 60, there is connected a branch circuit leading to an analog multiplexer 50 and an oscilloscope 70. Two analog multiplexers 50 and 55, one for each circuit, and a duel screen oscilliscope 70 are used in the system. The first multiplexer 50 is connected through leads 52 to the outputs of the amplifiers 40 of the four subcircuits of the first Circuit A and has coupled thereto a divide by four counter and decoder 54 which enables the multiplexer 50 to receive and pass in sequence the outputs of the subcircuit amplifiers 40 to an oscilloscope 70 for observation. A second multiplexer 55 is connected through leads 56 to the outputs of the amplifiers 40 of the remaining three subcircuits of the second circuit B and has coupled thereto a divide by four counter and a decoder 57 which enables the second multiplexer 55 to receive and pass to the oscilloscope 70 the output of the remaining three subcircuit's amplifiers 40. The fourth input of the multiplexer 55 of the second circuit B is connected by lead 58 to a capacitor 59 across a low frequency grounding resistor 62 for receiving pulses from a relaxation oscillator 64 to generate synchronization pulses for the oscilloscope 70. As oscilloscopes have many uses the branch circuit may terminate in connecting terminals to which an oscilloscope may be readily attached or detached for other uses.

Returning to the subcircuit, the detector 60 (FIG. 2*b* ) includes an emitter follower transistor 66 having its base coupled to the amplifier 40 (FIG. 2*a*) and its emitter coupled to the cathode of a rectifier 68. The emitter follower 66 eliminates most of the diode drop for half-wave rectification. The anode of the rectifier 68 is coupled across a resistor 72 by lead 69 to one end of a resistor 74; the other end of the resistor 74 is coupled by lead 76 across a capacitor 78 to the negative terminal of a comparator 80. The comparator 80 has its positive terminal connected to a variable threshold voltage provided by a potentiometer 82 coupled to minus VCC for setting the trip level of the detector 60. The arm of the potentiometer 82 is connected to a point in a feedback circuit 90 and to a capacitor 92 for passing any AC to ground. The feedback circuit 90 includes a resistor 94 having one end coupled by lead 96 to the output of the comparator 80 and its other end coupled to the potentiometer arm and to the positive terminal of the comparator. The resistor 94 of the feedback circuit is used to latch up the comparator when the threshold voltage is exceeded. At this point in the subcircuit a second branch circuit is provided which couples the subcircuit to a disc signal device 110. The second branch circuit includes a silicon controlled rectifier (SCR) 100 having its gate coupled by lead 102 to the output of the comparator 80 across a shunt resistor 104 through a capacitor 105. The shunt resistor 104 is connected to lead 102 at point 106 across the gate to the cathode of the SCR 100. The anode of SCR 100 is coupled through lead 108 to the signal device 110 such as a lamp. As there are seven subcircuits, one for each memory disc, there is a bank of seven signal lights.

Returning again to the subcircuit and to the comparator 80 of the subcircuit, the output of the comparator 80 is connected by lead 122 to an input of an "OR" circuit 130. The "OR" circuit 130 is of conventional design and for the first circuit of the detector system has four input terminals to accommodate four subcircuits; for the second circuit it has three input terminals for the remaining subcircuits. The "OR" circuit 130 has its single output connected to the coil of the relay 124 through lead 126. The relay 124 is connected to the master switch (not shown) of the computer memory.

The operation of the magnetic memory system is as follows: The magnetic memory discs 10 are rotated by rotation of their shaft 11. When the read or write heads 16 are aerodynamically stable the transducers 12 attached to the yokes 15 detect only those normal computer memory vibrations (about 10 kc) within the operative range of the transducers, which is from about 10 kc to at least 45 kc. The Tschebyscheff filters 30 do not pass in any substantial amount these normal vibration frequencies and the detector 60 is inactive. Should any of the flying heads 16 collide with a memory disc 10 or with dust on the disc 10 with damaging force the resulting increased yoke vibrations, which are up to at least 25 kc and thus ultrasonic, are detected by the transducer 12 for that particular yoke 15 and corresponding electrical signals are passed to the differential amplifier 20 where they are amplified and passed to the Tschebyscheff filter 30. It will be understood that with slight modification of the circuit the first amplifier 20 could be omitted but its presence protects the transducer from overloading, and increases the sensitivity of the collision detector subcircuits.

Frequencies within the operative range of the Tschebyscheff filter 30 (25–45 kc) are passed to the single ended input amplifier 40 where they are amplified and passed in two directions. One direction is to the multiplexer 50 or 55 which is looking in sequence at each subcircuit feeding it and displaying what it sees on the oscilloscope 70. The oscilloscope pattern can be interpreted to identify the type of hit occurring between the disc 10 and head 16; that is, whether it is a dust hit or a direct collision of the head and disc. The oscilloscope 70 is particularly useful for maintenance operations and for observing computer memory operation during start up. The second direction of the amplified frequencies is to the detector 60 which during the normal operation of the computer memory has had its "OR" circuit 130 for the master switch operating relay 124 and the SCR 100 for the lamp 110 switched off or in the zero state. The amplified frequencies pass through the emitter follower 66 to the rectifying diode 68 for half-wave rectification. The ripple in the AC current is removed by the RC circuit and the current passed to the comparator 80. The potentiometer 82 of the variable threshold voltage circuit has been adjusted to provide a standard voltage equal to the voltage generated by the transducer 12 by damaging hits between the memory disc 10 and heads 16 for the particular yoke 15. When the DC current entering the comparator reaches the threshold voltage it delivers an output signal which is maintained through action of the feedback circuit 90. The signal switches the "OR" circuit 120 from the off state to the on state to actuate the master switch relay 124 to shut down the computer memory to prevent damage to the disc and head; and at the same time to trigger the SCR 100 to light the disc indicating lamp 110.

What is claimed is:

1. A computer memory system comprising:

a. a plurality of magnetic memory elements;

b. a plurality of read-write heads;

c. means for effecting relative movement between the memory element and plurality of read-write heads;

d. a yoke assembly for each of said plurality of magnetic memory elements, said yoke assembly arranged so as to carry the plurality of read-write heads in operative association with their respective magnetic memory element;

e. a piezoelectric element for each yoke assembly, said piezoelectric element being attached to its respective yoke assembly to generate electrical signals at a frequency corresponding to the vibrations of the yoke assembly; and f. a circuit including a filter means for each piezoelectric element, said filter means coupled to its respective piezoelectric element to attenuate normal operating frequencies and to pass frequencies corresponding substantially to disc damaging vibrations, and a detector means including a switch actuating relay operatively coupled to the frequency filter output for shutting down the system responsive to disc damaging frequencies.

2. A computer memory system according to claim 1, wherein the detector means further includes a memory element indicating signal means including a signal indicator coupled to the filter for its respective memory element for indicating responsive to the filter output the memory element having an aerodynamically unstable head.

3. A computer memory system according to claim 2, wherein an oscilloscope is coupled to the output of each filter means for monitoring the frequency pattern of each filter means.

4. A computer memory system comprising:

a. a plurality of magnetic memory elements;

b. means for rotating the plurality of magnetic memory elements;

c. a plurality of read-write heads;

d. a yoke assembly for each of said plurality of magnetic memory elements, said yoke assembly arranged so as to carry the plurality of read-write heads in operative association with their respective magnetic memory element;

e. a piezoelectric element for each yoke assembly, said piezoelectric element being attached to its respective yoke assembly to generate electrical signals at a frequency corresponding to the vibrations of the yoke assembly;

f. a first amplifier operatively coupled to the piezoelectric element for amplifying the electrical signals generated by the piezoelectric element;

g. a frequency filter means coupled to the first amplifier output, said filter means attenuating electrical signals indicative of normal vibrations and passing electrical signals indicative of damaging vibrations; and h. detector means including a circuit breaker means operative responsive to the filter output to shut down the computer.

5. A computer memory system according to claim 4, wherein said detector means includes:

a. an "OR" circuit having an input coupled to the output of the filter for each tranducer and a single output; and b. a switch actuating relay connected to the "OR" circuit single output whereby a signal received from any filter activates the switch actuating relay to shut down the computer.

6. A computer memory system according to claim 4, wherein said detector means further comprises:

a. a bank of signal lamps; and b. a silicon controlled rectifier coupled between each lamp of said bank and its respective filter output, whereby a signal received from any filter activates a corresponding lamp of the lamp bank.

7. A computer memory system according to claim 4, further comprising a multiplexer having a plurality of input ends and an output end, each input end coupled to the output of a corresponding filter means, and the output end having a terminal for connecting an oscilloscope; and a sequencing means including a counter, a decoder, and a relaxation oscillator coupled to the multiplexer and coacting therewith to provide in sequence yoke assembly frequency patterns for an oscilloscope.

8. A computer memory system according to claim 4, wherein the detector means includes:

a. a plurality of converter means, each converter means coupled to a corresponding filter output for converting the AC signals of the filter to DC;

b. a plurality of comparators, each comparator coupled to a corresponding converter for comparing the dc to a standard signal representing a respective memory element damaging yoke assembly vibration;

c. an "OR" circuit having an input coupled to each comparator; and d. a switch actuating relay coupled to the output end of the "OR" circuit whereby in operation signals representing a damaging yoke assembly vibration issuing from the corresponding comparator energize the switch actuating relay to shut down the computer memory system.

9. A computer memory system according to claim 8, comprising:

a. a plurality of silicon controlled rectifiers, each silicon controlled rectifier coupled to the output of a comparator; and b. a bank of lamps, each lamp coupled to the anode of a corresponding silicon controlled rectifier, whereby in operation signals representing a damaging yoke assembly vibration issuing from the corresponding comparator energize its respective lamp to indicate the memory element having an aerodynamically unstable head.

10. A computer memory system comprising:

a. a plurality of magnetic memory elements;

b. a plurality of read-write heads;

c. means for effecting relative movement between memory elements and plurality of read-write heads;

d. a yoke assembly for each of said plurality of magnetic memory elements, said yoke assembly arranged so as to carry the plurality of read-write heads in operative association with their respective magnetic memory element;

e. a transducer for each yoke assembly, said transducer being attached to its respective yoke assembly to generate electrical signals at a frequency corresponding to the vibrations of the yoke assembly; and f. a circuit including a filter means for each transducer, said filter means coupled to its respective transducer to pass frequencies corresponding substantially to disc damaging vibrations, and a multiplexer having a plurality of input ends and an output end, each input end coupled to the output of a corresponding filter means, and the output end having a terminal for connecting an oscilloscope; and a sequencing means including a counter, a decoder, and a relaxation oscillator coupled to the multiplexer and coacting therewith to provide in sequence yoke assembly frequency patterns for an oscilloscope.

11. The memory system defined in claim 10, wherein an alarm means is connected to said selective means responsive to said predetermined output signal for actuating an alarm.

12. A computer memory system according to claim 10, further comprising a detector means including a circuit breaker, said detector means operative responsive to the filter output for detecting disc damaging frequencies and thereafter shutting down the system.

13. A computer memory system according to claim 12 wherein the detector means comprises:

a. a plurality of converter means, each converter means coupled to a corresponding filter output for converting the AC signals to the filter to DC;

b. a plurality of comparators, each comparator coupled to a corresponding converter for comparing the DC to a standard signal representing a respective memory element damaging yoke assembly vibration;

c. an "OR" circuit having an input coupled to each comparator; and d. a switch actuating relay coupled to the output end of the "OR" circuit whereby in operation signals representing a damaging yoke assembly vibration issuing from the corresponding comparator energize the switch actuating relay to shut down the computer memory system.

14. A computer memory system according to claim 12, wherein said detector means includes:

a. an "OR" circuit having an input coupled to the output of the filter for each transducer and a single output; and b. a switch actuating relay connected to the "OR" circuit single output whereby a signal received from any filter activates the switch actuating relay to shut down the computer.

15. A computer memory system according to claim 14, wherein said detector further comprises:

a. a bank of signal lamps; and b. a silicon controlled rectifier coupled between each lamp of said bank and its respective filter output, whereby a signal received from any filter activates a corresponding lamp of the lamp bank.

16. A memory system comprising a memory member and an information handling head member disposed for a relative movement therebetween, means for effecting relative movement between said members, said members being characterized by producing when in a normal operational mode a first spectrum of vibrational frequencies and when in a failure operational mode a second spectrum of vibrational frequencies, a sensor having a piezoelectric element responsive to the vibrational frequencies to generate an electrical frequency response indicative of the vibrational frequencies, circuit means responsive to the output of the piezoelectric element for attenuating the normal electrical frequency response and passing any failure indicating electrical frequency response; and selective means operative responsive to any failure indicative electrical frequency response for conveying failure information and shutting down the system.

* * * * *